Patented Jan. 30, 1945

2,368,521

UNITED STATES PATENT OFFICE 2,368,521

AMINES

Albert M. Clifford and Joy G. Lichty, Stow, Ohio, assignors to Wingfoot Corporation, Akron, Ohio, a corporation of Delaware No Drawing. Application November 17, 1942, Serial No. 465,913

1 Claim. (Cl. 260—584)

This invention relates to a new chemical compound having both hydroxyl and amine functions. More specifically it relates to a diamine having hydroxyethyl radicals substituted on one of the nitrogen atoms.

The new compound is useful as an intermediate in the synthesis of organic compounds, particularly the alkyd or ester-amide condensation resins formed by interaction with dicarboxylic acids.

The preparation involves reacting diethanol amine and acrylonitrile to form an intermediate. The secondary amino group of the former compound reacts with the olefinic bond of the latter compound. The resulting intermediate, a substituted propionitrile, is then hydrogenated to form the new compound. The reactions are as follows:

HO—$C_2H_4$—NH—$C_2H_4$—OH+$CH_2$=CH—CN

→(HO—$C_2H_4$)$_2$—N—$CH_2$—$CH_2$—CN+$H_2$

→(HO—$C_2H_4$)$_2$—N—$CH_2$—$CH_2$—$CH_2$—$NH_2$

The following detailed example is a typical method of producing our new compound.

Example

Five hundred thirty-seven and four tenths grams of diethanol aminopropionitrile (prepared by adding diethanol amine to acrylonitrile) were hydrogenated in the presence of Raney nickel catalyst. A maximum hydrogen pressure was about 1100 pounds, and the maximum temperature was about 150° C. On distillation the resulting product gave a considerable fraction of low-boiling amines, including diethanol amine. The diethanol-trimethylene diamine was found in a higher boiling fraction. $N_D^{27}$ 1.4935. It has a boiling point of 195–200° C. at 22 mm. This material has the formula (HO$C_2H_4$)$_2$N$C_3H_6$N$H_2$.

Although the invention is described with respect to a specific method, it should be apparent that the new compound may be produced by other methods or by methods involving modifications of the above preferred procedure.

What we claim is:

N,N - di - (2 - hydroxyethyl) - trimethylene diamine.

ALBERT M. CLIFFORD.
JOY G. LICHTY.